U S006808283B2

(12) United States Patent
Tsao

(10) Patent No.: US 6,808,283 B2
(45) Date of Patent: Oct. 26, 2004

(54) SENSITIVE LIGHTING FIXTURE FOR CONSTRUCTION JUNCTION BOX

(76) Inventor: Frank Wen-Chung Tsao, 5 Fl. NO. 79 Kang Fu Rd., Sec. 1, Sangchung City, Taipei Hsian (TW)

( * ) Notice: Subject to any disclaimer, the term of this patent is extended or adjusted under 35 U.S.C. 154(b) by 40 days.

(21) Appl. No.: 10/238,420

(22) Filed: Sep. 9, 2002

(65) Prior Publication Data

US 2003/0021104 A1 Jan. 30, 2003

Related U.S. Application Data

(63) Continuation-in-part of application No. 09/922,903, filed on Aug. 6, 2001, now abandoned.
(60) Provisional application No. 60/291,750, filed on May 16, 2001.

(51) Int. Cl.[7] ............................................... F21V 33/00
(52) U.S. Cl. .................... 362/95; 362/147; 362/260; 362/276; 362/365; 439/239; 439/893
(58) Field of Search .............................. 362/145, 146, 362/147, 152, 95, 364, 365, 217, 218–225, 20, 86, 88, 127, 133, 154, 226, 260, 276, 310, 311, 368, 374; 439/133, 135, 136, 147, 149, 150, 226, 232, 239, 892, 893; 200/237, 308, 310, 317

(56) References Cited

U.S. PATENT DOCUMENTS 1,694,158 A * 12/1928 Both .......................... 174/54
1,775,768 A * 9/1930 Kenerson .................... 362/147
2,428,167 A * 9/1947 Linton .......................... 362/95
2,749,428 A * 6/1956 McCarthy ..................... 362/95
4,225,808 A * 9/1980 Saraceni ..................... 315/307
4,343,032 A * 8/1982 Schwartz .................... 362/276
5,258,899 A * 11/1993 Chen .......................... 362/394
5,763,872 A * 6/1998 Ness .......................... 362/368
5,803,589 A * 9/1998 Lee ............................ 362/225
6,062,704 A * 5/2000 Holder ....................... 362/223
6,390,647 B1 * 5/2002 Shaefer ....................... 362/310

* cited by examiner

Primary Examiner—Thomas M. Sember
Assistant Examiner—Ismael Negron
(74) Attorney, Agent, or Firm—Raymond Y. Chan; David and Raymond Patent Group

(57) ABSTRACT

A sensitive lighting fixture, adapted for incorporating with the construction junction box built on wall, ceiling or floor to form a utility lighting device, includes a base seat including a front plate and a recessed case rearwardly extended from the front plate, a light source disposed in the light source socket, a light shade detachably attached to the front plate of base seat and sized to cover the light source opening, a control sensor provided on the front plate of the base seat and exposed to outside, and a control device for electrically connecting the light source with the electric wires extended inside the construction junction box and electrically connecting the control sensor and the light source in such a manner that the control sensor turns the light source off when the visible light detector detects ambient light and on when the control sensor does not detect ambient light.

59 Claims, 14 Drawing Sheets

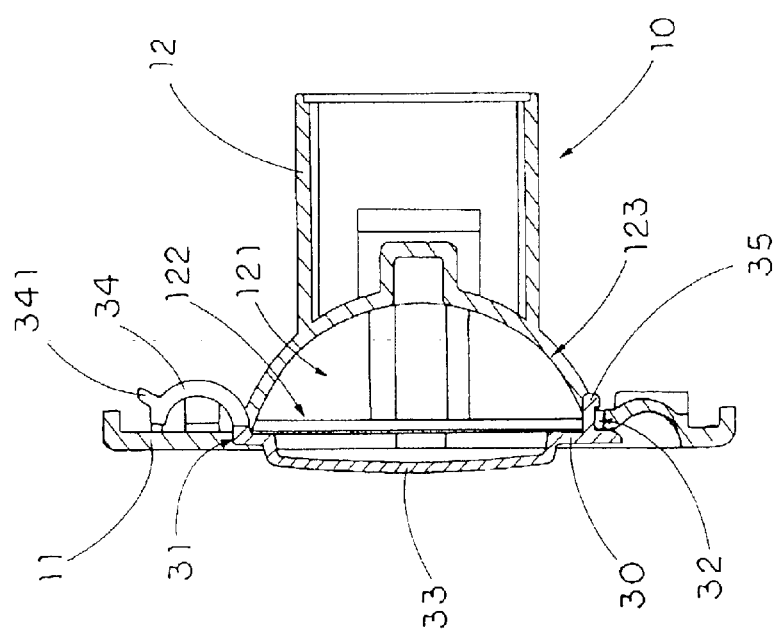

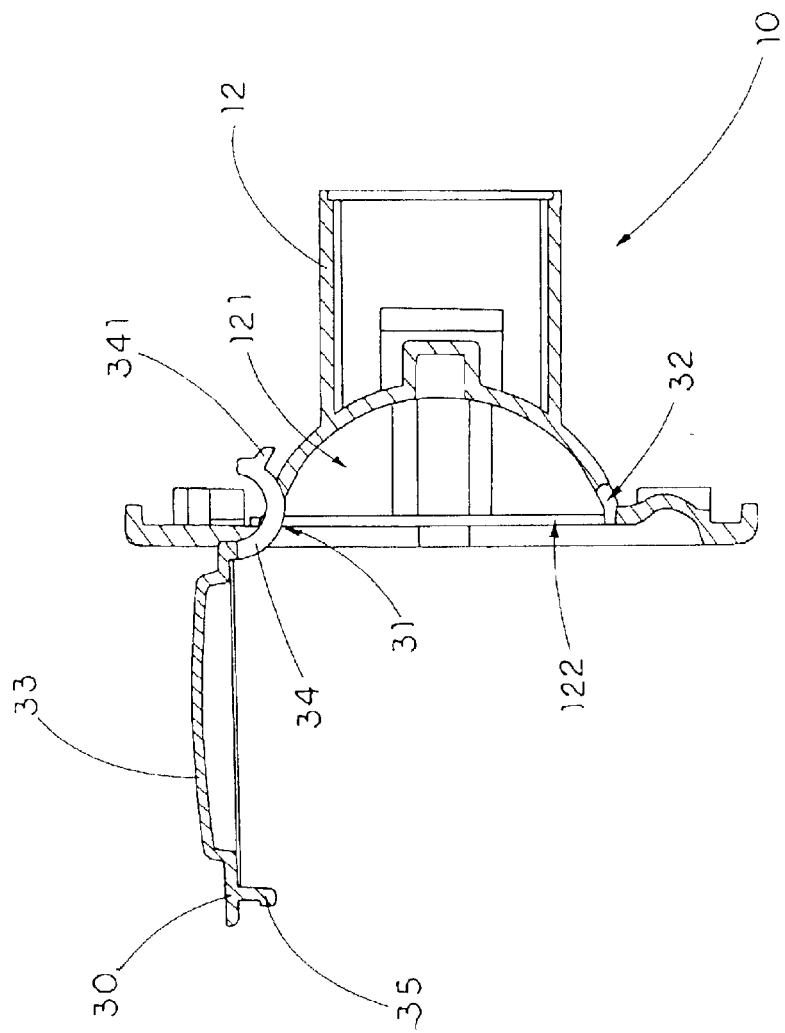

SENSITIVE LIGHTING FIXTURE FOR CONSTRUCTION JUNCTION BOX

CROSS REFERENCE OF RELATED APPLICATION

This is a Continuation-In-Part application of a non-provisional application, application Ser. No. 09/922,903, filed Aug. 6, 2001, now abandoned which claims the benefit of provisional application, application No. 60/291,750, filed May 16, 2001.

BACKGROUND OF THE PRESENT INVENTION

1. Field of Invention

The present invention relates to the construction junction box, and more particularly to a sensitive lighting fixture constructed for replacing a junction box cover, a wall socket or a switch panel to incorporate with the metal made junction box to form a utility lighting device.

2. Description of Related Arts

Wall sockets are preinstalled on walls in every commercial and residential building to provide sources of electricity that the users can electrically connect electrical appliances thereto for electricity supply by plugging their electric plugs into the sockets. Generally, as shown in FIG. 1, electric wires A1 are extended to the location of a wall socket B1 where the electric wires A1 are electrically connected with the terminals of the wall socket B1. Since electrical connections between the wires A1 and wall socket B1 must avoid hazardous environment such as moisture and dust, a metal made construction junction box A2 was pre-installed in the wall C1 by, for example, mounting to wall construction beam C2 while the building was built, wherein the terminal end portions of the electrical wires A1 are extended into the interior cavity of the construction junction box A2. To install the wall socket B1, it is merely mounted in front of the construction junction box A2, so that the electrical connection between the wires A1 and the terminals of the wall socket B1 are protected within the construction junction box A2 from outside. Similarly, the wall mount switch panel D1 is also constructed to be mounted in front of the construction junction box A2 to protect its electrical connections.

However, due to the construction requirement of utilizing the construction junction boxes for wall sockets and switch panels construction, most of the buildings will provide as many construction junction boxes as possible so that the user, especially for the commercial owners of the buildings, can install switches or sockets based on their real need. However, when any construction junction box A2 is not in use, that is no wall socket C1 or switch panel D1 is need to install to the construction junction box A2, a junction box cover E1 is be used to cover the construction junction box A2 from outside.

Also, when a wall socket B1 is not in use, a plastic plug cover F1 is suggested to be plugged into the wall socket B1 in order to prevent the children from reaching the sockets or blocking liquid from entering the wall socket B1 through the plug holes. However, such plug cover F1 may only work for baby child at age three or less. To those wall sockets B1 that are not normally in use, it is too simply for older kids to unplug the plug covers F1 and play with those wall sockets B1. Therefore, to any wall socket that is not in use generally, it is recommended to replace the wall socket B1 with the junction box cover E1 for protection and keeping from reach of kids. For safety reason, it is nothing wrong to permanently cover a non-use construction junction box. However, for utility purpose, it is a waste of resources to do so.

On the other hand, night lighting fixtures are used both indoors and outdoors to light walkways, stairs, bathrooms, bedrooms, and other places, where a low level of illumination is desired for purposes of safety and convenience.

In general, outdoor fixtures are recessed within the wall structure and are connected to the normal electrical wiring system contained in homes, apartments and other buildings. These fixtures usually have an exposed face or plate provided with louvers or other similar openings through which the light passes to provide illumination. The balance of the fixture is recessed and concealed within the wall structure. The light is usually turned on and off manually or by a pre-set timer. Where photocells have been used, the photocell has been separate from the recessed fixture.

In the case of a manually operated fixture, conservation of light and electrical energy is dependent upon timely human intervention. A pre-set timer maintains the period pre-set for illumination and is not responsive to actual external ambient lighting conditions. Consequently, it is possible that the electrical light is turned on when illumination is not needed, and turned off when darkness prevails creating a hazard and risk to security.

U.S. Pat. No. 4,343,032 discloses an indoor night light which is generally not recessed and project outwardly from the wall, presenting a hazard to children and inconvenience. Outdoor light fixtures are sealed against the elements in many cases. Indoor lights are not sealed and are unsuited for outdoor use. U.S. Pat. No. 2, 857,371 discloses a recessed lighting fixture to be integrally installed to a hole made on a wall. It likes a wall lamp that the user needs to make a hole on the wall in precise dimension for screwing the recessed lighting fixture thereon. However, such lighting fixture is specifically designed for the building constructors to install to newly built structures. It is well known that, in the United States, the walls, which are supported by vertical and horizontal building frames, are generally made of cardboards, asbestos boards or plaster boards that are not firm and rigid enough to support the lighting fixture. To home users and property owners, they not only may not know how to make a right hole at a right position to fit the recessed lighting fixture as suggested by the '371 patent, but also can't even locate where are the vertical or horizontal building frames behind the walls for screwing the lighting fixture thereto, as shown in FIGS. 2 and 3 of the '371 patent. One more difficulty for home users is that it requires a great skill and also is a great hazard to connect and extend electrical wires behind the walls to electrically connect with the light bulbs of the lighting fixtures for power supply.

SUMMARY OF THE PRESENT INVENTION

It is a main objective of the present invention to provide a sensitive lighting fixture which is specifically designed to incorporate with the construction junction box built on wall, ceiling or floor to form a utility lighting device, wherein the sensitive lighting fixture is capable of replacing the not-in-use wall socket or switch panel to avoid unwanted hazard to the environment while providing an additional utility function such as night light, walkway indicator, and etc. In other words, by replacing a non-use wall socket with the sensitive lighting fixture while using the existing construction junction box can substantially prevent the children and pets from getting electric shocks at the non-use wall sockets.

It is another objective of the present invention to provide a sensitive lighting fixture for construction junction box, wherein since the metal made existing construction junction box built on wall, ceiling or floor is used as an exterior housing of the sensitive lighting fixture, so that the sensitive lighting fixture of the present invention has no need to manufacture the metal case to enclose the electrical connections of the sensitive lighting fixture that reduces not only the manufacturing steps but also the product cost.

It is another objective of the present invention to provide a sensitive lighting fixture for construction junction box, which is easy to install and the users have no need to worry about the electrical power source for the sensitive lighting fixture since the electric wires are already extended and provided inside the construction junction box.

It is another objective of the present invention to provide a sensitive lighting fixture for construction junction box, which provides a recessed lighting fixture on wall without the need of drilling extra hole on wall and extending electric wires thereto from electric power source.

It is another objective of the present invention to provide a sensitive lighting fixture for construction junction box, which provides a recessed night light having a wall flat surface to avoid any component projected outwardly from the wall so as to present hazard to children and inconvenience.

It is another objective of the present invention to provide a sensitive lighting fixture for construction junction box, which provides a plug-in type fluorescent lamp in low voltage as light source and a specifically designed fluorescent lamp socket to receive and mount the plug-in type fluorescent lamp thereto, so that the unplugging of the plug-in type fluorescent lamp is as simple as just pulling out the plug-in type fluorescent lamp outwardly from the socket and the installation of the plug-in type fluorescent lamp is also as simple as just inwardly plugging in two terminal arms of the fluorescent lamp into two terminal slots of the fluorescent lamp socket respectively, wherein the fluorescent lamp has a better linear electric contact to ensure steady power supply.

It is another objective of the present invention to provide a sensitive lighting fixture for construction junction box, which comprises light shade utilizing a detachably hinge to connect with the base seat for covering the fluorescent lamp inside the light source recess, wherein the users can easily reach the fluorescent lamp for replacement by detaching or hinging up the light shade. Therefore, the users can change the fluorescent lamp of different color any time easily.

It is another objective of the present invention to provide a sensitive lighting fixture for construction junction box, which further comprises a light shelter to guide the light beams downwards so as to prevent direct front access of the lighting beams that may be annoyed with some users. In addition, a filter lens can be installed to the bottom opening of the light shelter to prevent insects from getting inside the light source recess.

It is another objective of the present invention to provide a sensitive lighting fixture for construction junction box, which comprises a visible light detecting photocell to control the switch on or off of the lighting fixture, whereby the photocell is adapted to turn the light source off when the photocell detects ambient light and on when the photocell does not detect ambient light.

It is another objective of the present invention to provide a sensitive lighting fixture for construction junction box, which further comprises a switch that enables the users to turn off the photocell and the lighting fixture at will. Moreover, an auxiliary socket with hinged cover is provided on the lighting fixture so as to provide a power source at that construction junction box for users who may occasionally need a power source at such location.

It is another objective of the present invention to provide a sensitive lighting fixture for construction junction box, wherein the user is free to change the color of the lamp and/or the color and style of the filter lens from time to time so as to match the interior design of the environment as well as the mood of the user.

In order to accomplish the above objectives, the present invention provides a sensitive lighting fixture for a construction junction box installed on a surface to provide a recessed cavity surrounding with metal walls, wherein electric wires from a power source are extended inside the recessed cavity, wherein the sensitive lighting fixture comprises a base seat comprising a front plate and a recessed case rearwardly extended from the front plate, wherein the recessed case has a light source socket indented therein and a light source opening opened on the front plate, wherein the recessed case is sized for disposing inside the recessed cavity of the construction junction box while the front plate is sized for covering the recessed cavity of the construction junction box; a light source disposed in the light source socket; a light shade which is detachably attached to the front plate of base seat and sized to cover the light source opening; a control sensor provided on the front plate of the base seat and exposed to outside; and means for electrically connecting the light source with the electric wires extended inside the construction junction box and electrically connecting the control sensor and the light source in such a manner that the control sensor turns the light source off when the visible light detector detects ambient light and on when the control sensor does not detect ambient light.

In an alternative mode, the sensitive lighting fixture of the present invention, which is constructed to incorporate with a construction junction box, includes at least one front plate, a light reflector disposed in the construction junction box, an electrical light source mounted in inside the light reflector, and a visible light detecting photocell being in electrical communication with the light source, wherein the front plate has a first opening for allowing external ambient light to reach the photocell. Whereby, the photocell is adapted to turn the light source off when the photocell detects ambient light and on when the photocell does not detect ambient light. The front plate further has a second opening adapted to allow for the passage of light from the electrical light source to provide illumination in the external space.

In another alternative mode, the sensitive lighting fixture of the present invention, which is constructed to incorporate with a construction junction box recessed within a wall, comprises at least one front plate which is exposed on the surface of the wall, a light reflector and an electrical light source disposed within the junction box, and a visible light detecting photocell being in electrical communication with the light source, wherein the front plate has a first opening for allowing external ambient light to reach the photocell. Whereby, the photocell is adapted to turn the light source off when the photocell detects ambient light and on when the photocell does not detect ambient light. The front plate further has a second opening to allow for the passage of light from the electrical light source to provide automatically illumination as required in the external space in response to ambient lighting conditions.

BRIEF DESCRIPTION OF THE DRAWINGS

FIG. 5A is a sectional side view of the base seat of the sensitive lighting fixture with the light shade attached thereto in a closed position according to the above preferred embodiment of the present invention.

FIG. 5B is a sectional side view of the base seat of the sensitive lighting fixture with the light shade attached thereto in an opened position according to the above preferred embodiment of the present invention.

DETAILED DESCRIPTION OF THE PREFERRED EMBODIMENT

Figure 1:
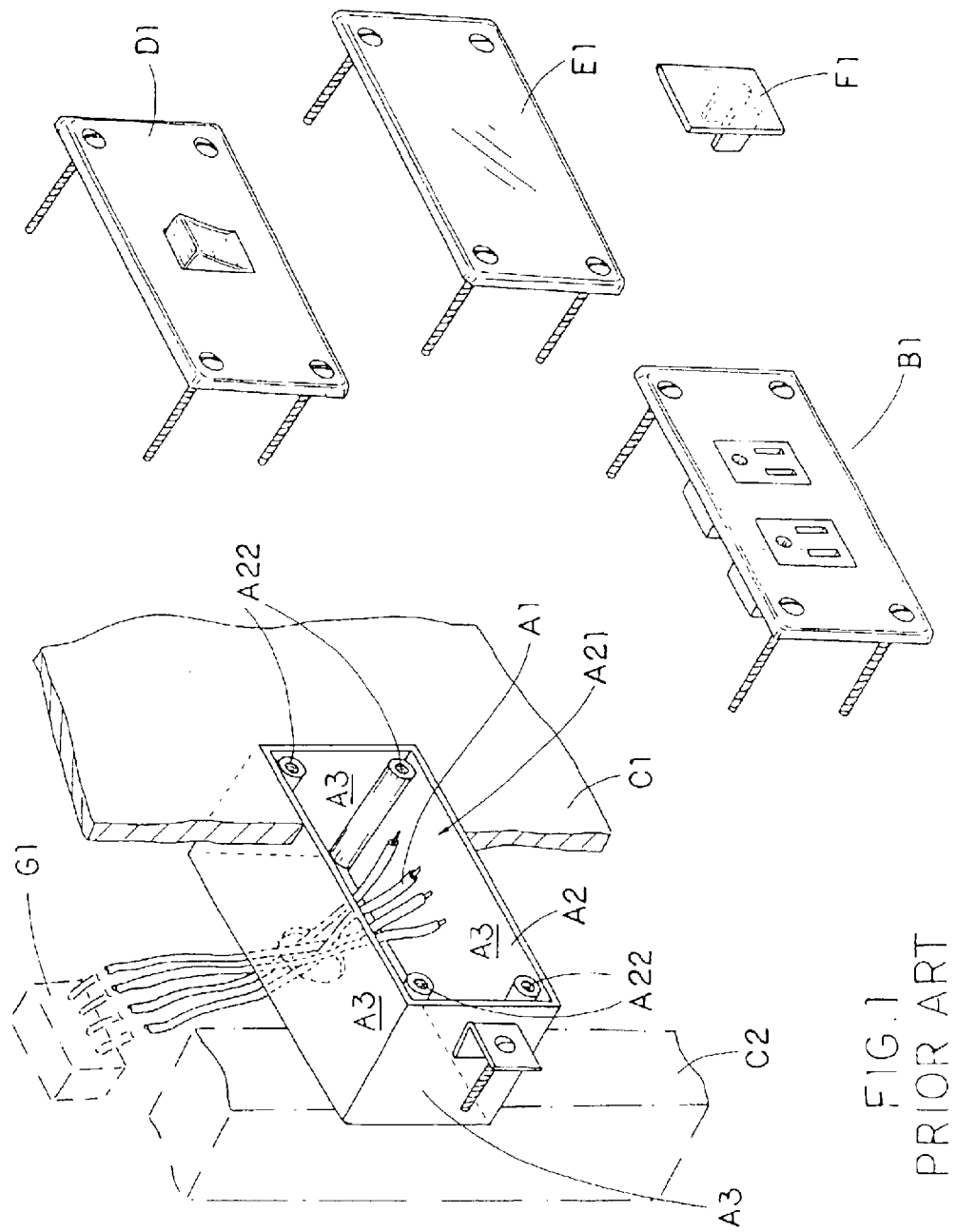
FIG. 1 is an exploded perspective view of a construction junction box for wall socket, switch panel or cover plate.

Referring to FIGS. 2 to 6, a sensitive lighting fixture 1 according to a preferred embodiment of the present invention is illustrated, which is constructed to incorporate with a construction junction box A2, as show in FIG. 1, installed on a wall surface, a ceiling surface or a floor surface to provide a recessed cavity A21 surrounding with metal walls A23 and four corner screw sockets A22, wherein electric wires A1 from a power source G1 are extended inside the recessed cavity A21.

The sensitive lighting fixture 1 comprises a base seat 10, a light source 20, a light shade 30, and a control sensor 40. The base seat 10 comprises a front plate 11 and a recessed case 12 rearwardly extended from the front plate 11, wherein the recessed case 12 has a light source socket 121 indented therein and a light source opening 122 opened on the front plate 11, wherein the recessed case 12 is sized for disposing inside the recessed cavity A21 of the construction junction box A2 while the front plate 11 is sized for covering the recessed cavity A21 of the construction junction box A2.

The light source 20, which is embodied as a plug-in type fluorescent lamp disposed in the light source socket 121, comprises a plug-in type fluorescent lamp seat 21 and a fluorescent lamp element 22 mounted on the fluorescent lamp seat 21. The sensitive lighting fixture 1 further comprises a control means 50 for electrically connecting the light source 20 with the electric wires A1 extended inside the construction junction box A2.

Figure 2:
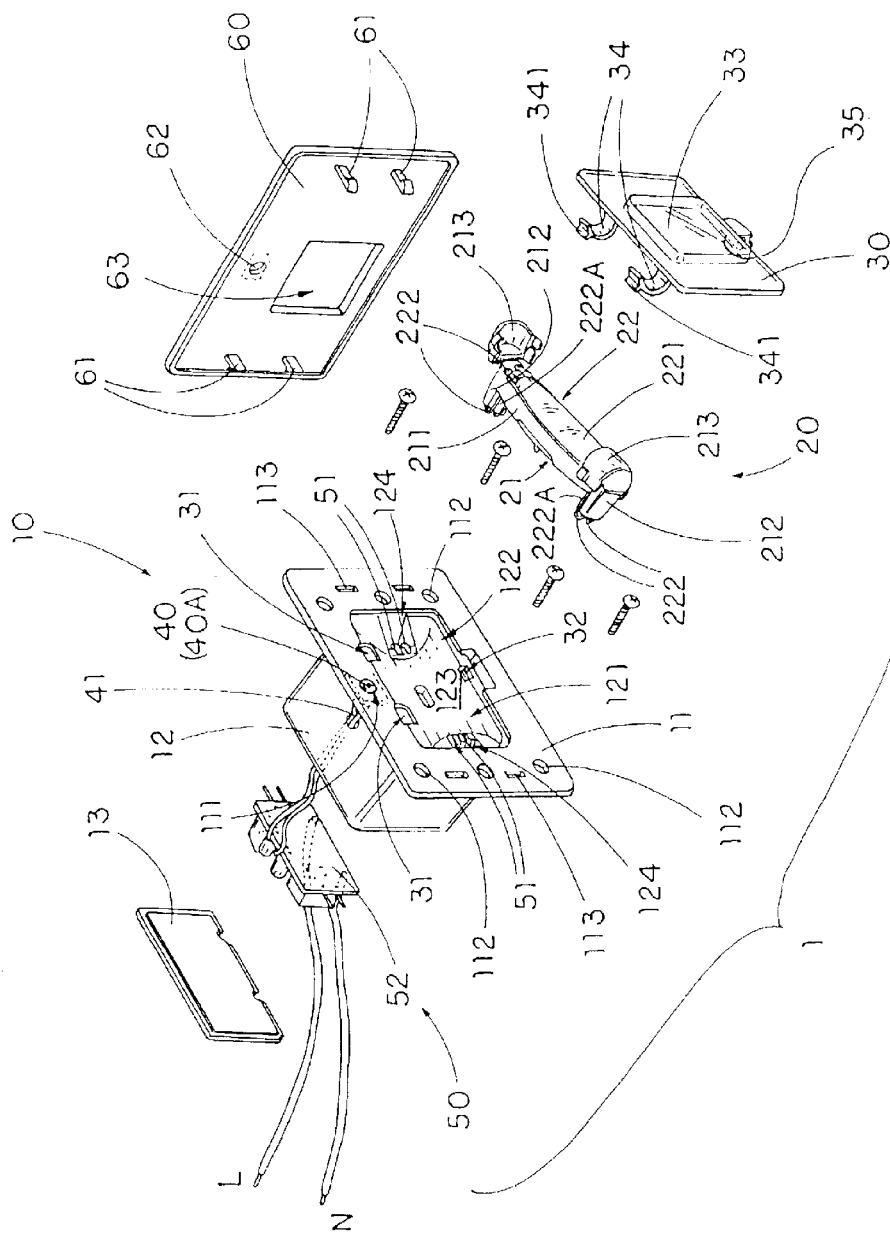
FIG. 2 is an exploded perspective view of a sensitive lighting fixture for construction junction box according to a preferred embodiment of the present invention.
Figure 4:
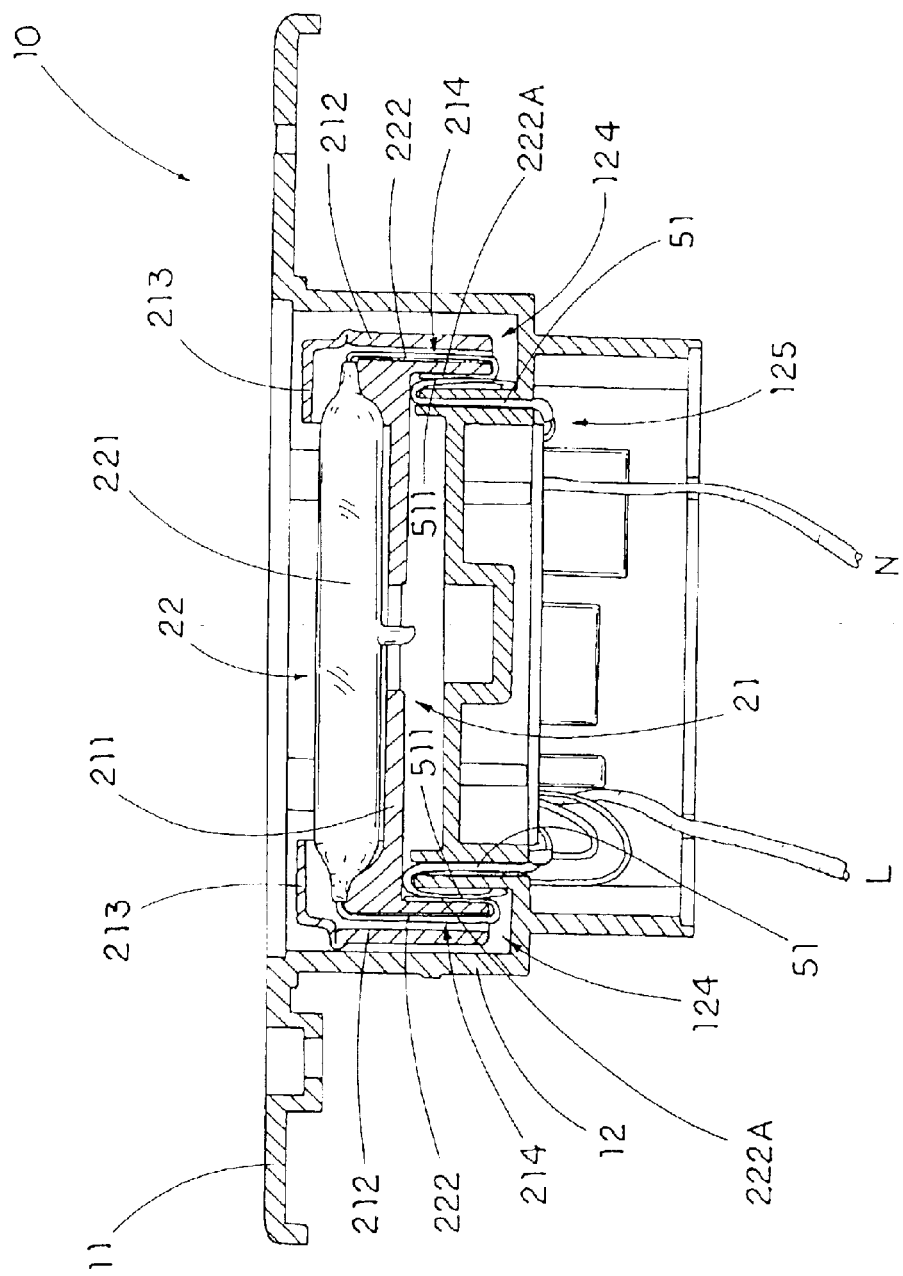
FIG. 4 is a sectional top view of the sensitive lighting fixture with the light shade being detached according to the above preferred embodiment of the present invention.

As shown in FIGS. 2 and 4, the fluorescent lamp element 22 comprises a tubular fluorescent lamp bulb 221 and two pairs of terminal wires 222 extended from two ends of the fluorescent lamp bulb 221. The fluorescent lamp seat 21 comprises a Arc shaped seat housing 211 having a front opening, two terminal arms 212 are rearwardly extended from two ends of the seat housing 211, and two end holders 213 hinged at two ends of the seat housing 211, wherein each of the two terminal arms 212 has a pair of though holes 214. The fluorescent lamp element 22 is arranged to sit on and extend along the fluorescent lamp element 22 and the two pairs of terminal wires 222 are rearwardly extended through the two pairs of through holes 214 until four terminal end portions of the terminal wires 222 are rearwardly extended out of the terminal arms 212 respectively and bent inwardly to against two inner contact sides of the two terminal arms 212 respectively to form two pairs of electrical terminal contacts 222A.

Correspondingly, the light source socket 121 has an arc shaped light reflection surface 123 and provides two terminal slots 124 spaced apart adapted for the two terminal arms 212 to insert therein respectively so as to mount the light source 20 within the light source socket 121 and being positioned in front of the reflection surface 123.

The control means 50 includes two pairs of socket terminals 51 extended through the recessed case 12 and a circuit unit 52. Each of the socket terminals 51 has a front resilient portion extended into the respective terminal slot 124 to form a socket terminal 511 and a rear end extended into a rear chamber 125 of the recessed case 12 where the circuit unit 52 is received therein. The two pairs of socket terminals 511 are arranged in such a manner that when the two terminal arms 212 of the light source 20 are plugged into the two terminal slots 124 respectively, the two pairs of socket terminals 511 are pressed against the two pairs of terminal contacts 222A for conducting electricity between the circuit unit 52 and the fluorescent lamp element 22 of the light source 20.

Figure 6:
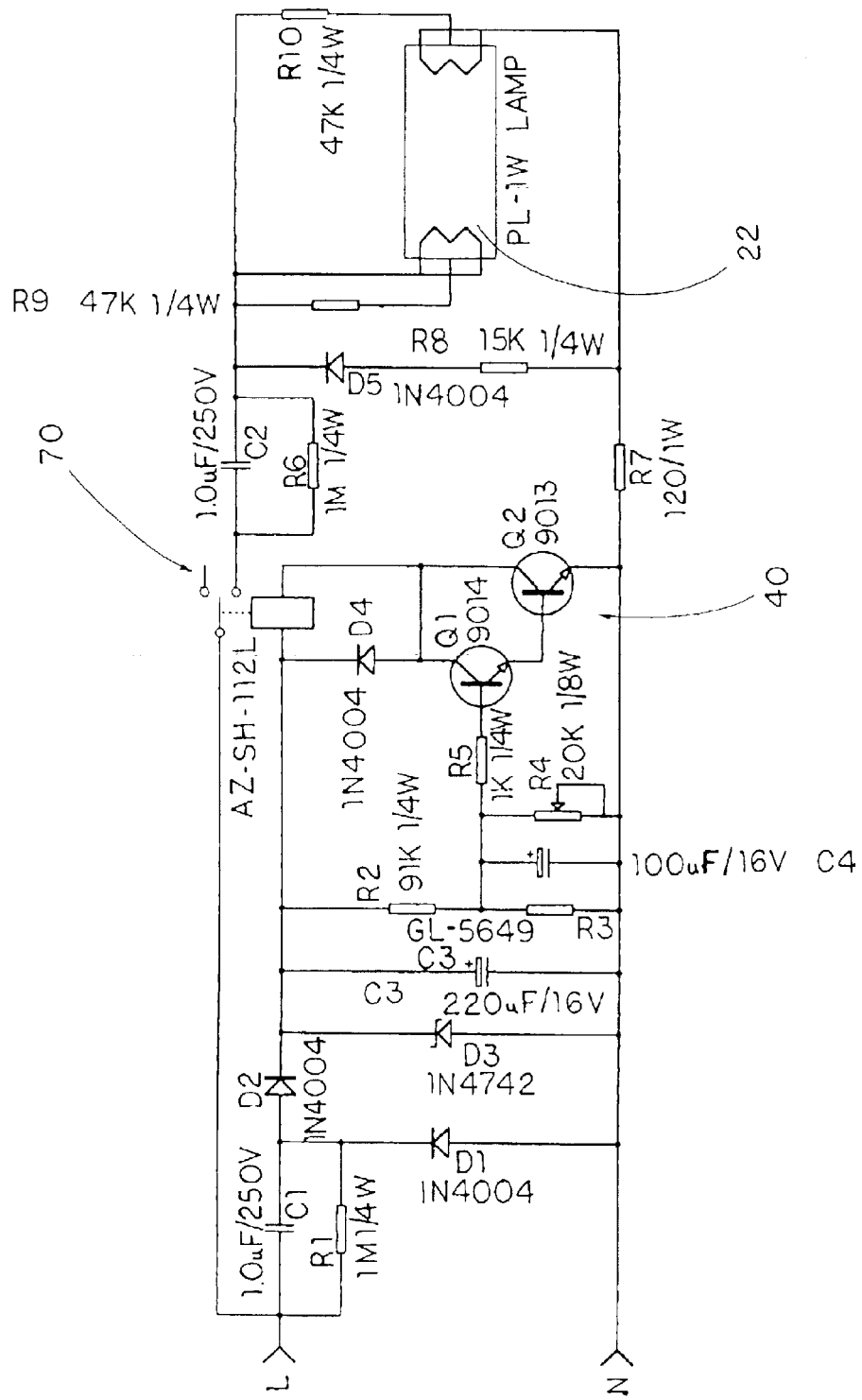
FIG. 6 is a circuit diagram of the sensitive lighting fixture according to the preferred embodiment of the present invention.

FIG. 6 illustrates an embodied circuitry of the circuit unit 52 which mainly interacts the control sensor 40 with the light source 20 in such a manner that the control sensor 40 turns the fluorescent lamp element 22 of the light source 20 off when the control sensor 40 detects an off-condition and on when the control sensor 40 detects an on-condition. As shown in FIG. 2, a sensor opening 111 is form at an upper position of the front plate 11 and the control sensor 40 is mounted at the sensor opening 111.

According to the preferred embodiment, as shown in FIG. 2, the control sensor 40 is embodied as a visible light detector 40A such as a visible light detecting photocell that is electrically connected to the circuit unit 52 through electric cords 41 and adapted to turn the light source 20 off when the visible light detecting photocell 40A detects ambient light (i.e. the off-condition) and on when the visible light detecting photocell 40A does not detect ambient light (i.e. the on-condition).

Alternatively, the control sensor 40 can be a motion sensor 40B mounted at the sensor opening 111, wherein the motion sensor 40B is adapted to turn the light source 20 off when there is no live motion is detected (i.e. the off-condition) and on when there is live motion detected (i.e. the on-condition). Other control sensors may be used to control the switch on/off of the light source 20 under predetermined conditions automatically.

Figure 7:
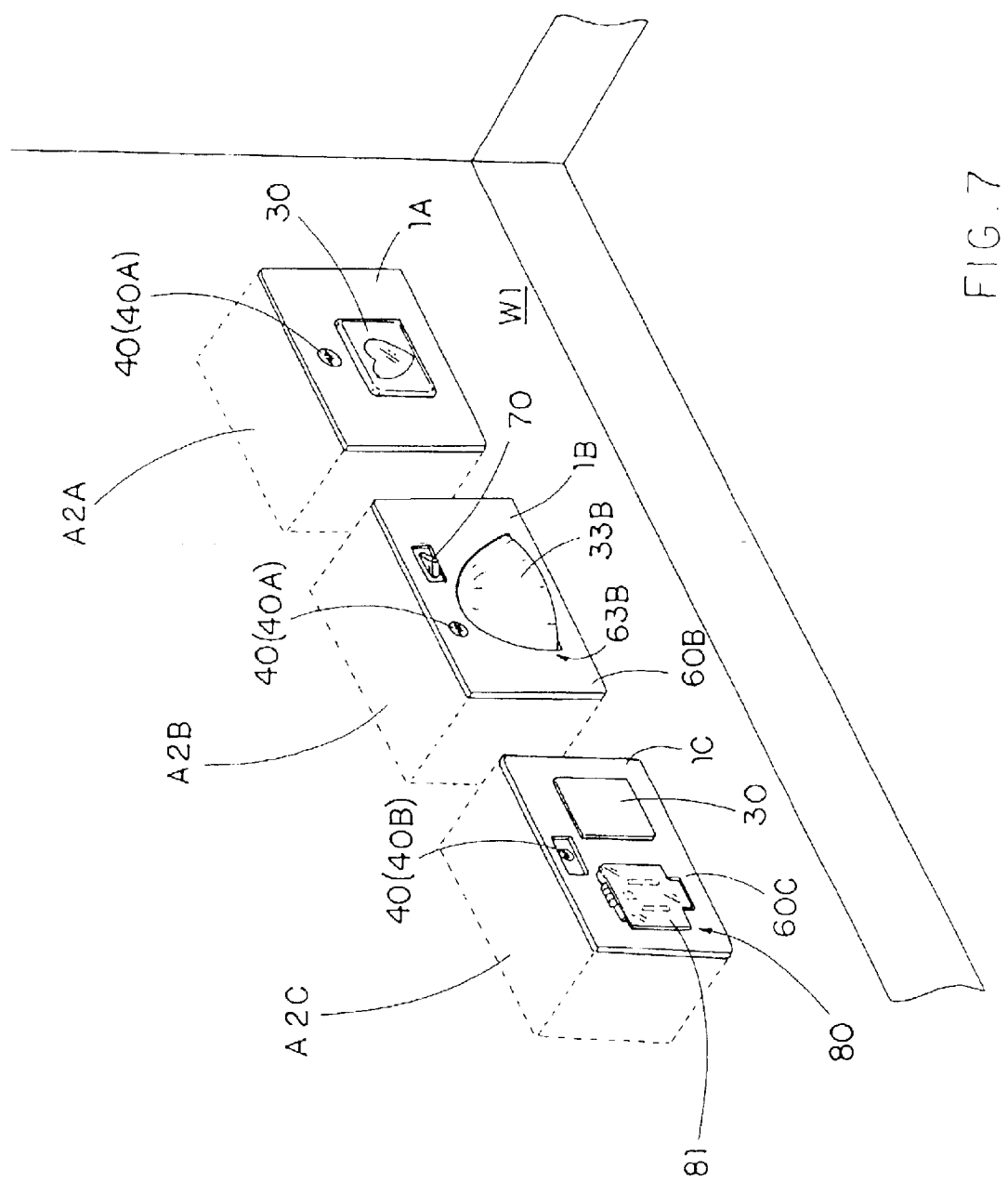
FIG. 7 is a perspective view illustrating a first, a second and a third alterative mode of the sensitive lighting fixture for construction junction box according to the above preferred embodiment of the present invention.

The control means 50 further comprises elongated input wires L, N extended from the circuit unit 42 for electrically connecting with the electric wires A1 within the recessed cavity A21 for power source connection while the recessed case 12 is disposed inside the recessed cavity A21. The front plate 11 fully covers the recessed cavity A21 and lies flat on the wall, ceiling or floor surface (as shown in FIG. 7). The front plate 11 has a plurality of mounting holes 112 provided at two side portions that are aligned with the four corner screw sockets A22 of the construction junction box A2, so that the base seat 10 can be fastened in position by screwing the front plate 11 to the construction junction box A2 through the mounting holes 112 and the screw sockets A22.

As shown in FIG. 2, the base seat 10 further comprises a case cover 13 attached to a rear end of the recessed case 12 so as to cover the rear chamber 125 thereof to enclose the circuit unit 52.

Referring to FIGS. 2, 3A, 5A, and 5B, the light shade 30 of the sensitive lighting fixture 1 of the present invention is detachably attached to the front plate 11 of base seat 10 and sized to cover the light source opening 122. According to the preferred embodiment of the present invention, a pair of hinge slots 31 are spacedly formed at a top edge of the lighting source opening 122 and a locking slot 32 is formed at a bottom edge of the lighting source opening 122. The light shade 30 comprises a frontwardly protruded cover lens 33 that light beam can pass through, two hinge arms 34 spacedly extended from a top side of the light shade 30 rearwardly, and a locker latch 35 protruded rearwardly from a bottom side of the light shade 30. Each of the hinge arms 34 has an arc shape and comprises a stopper rib 341 rearwardly and upwardly protruded from a free end portion of the Arc shaped hinge arm 34.

The light shade 30 is detachably attached to the front plate 11 of base seat 10 by inserting the two Arc shaped hinge arms 34 through the two hinge slots 31 respectively until they are positioned behind the front plate 11, as shown in FIGS. 5A and 5B. Therefore, the light shade 30 will be hanged down due to gravity normally, as shown in FIG. 5A. In addition, the light shade 30 can be locked in position by engaging the locker latch 35 in the locking slot 32. When the user need to replace the light source 20 with a new one or one with different color, the user may simply disengage the locker latch 35 from the locking slot 32 and lift up the light shade 30 about the hinge arms 34 at the hinge slots 31, as shown in FIG. 5B, until the stopper ribs 341 block against a top wall of the recessed case 12. In other words, the arc-shape of the hinge arms 34 enables the light shade 30 swinging up and down through the hinge slots 31 and the stopper ribs 341 prevent the hinge arms 34 from directly swinging out of the hinge slots 31 and limit the maximum opened position of the light shade 30.

Figure 3A:
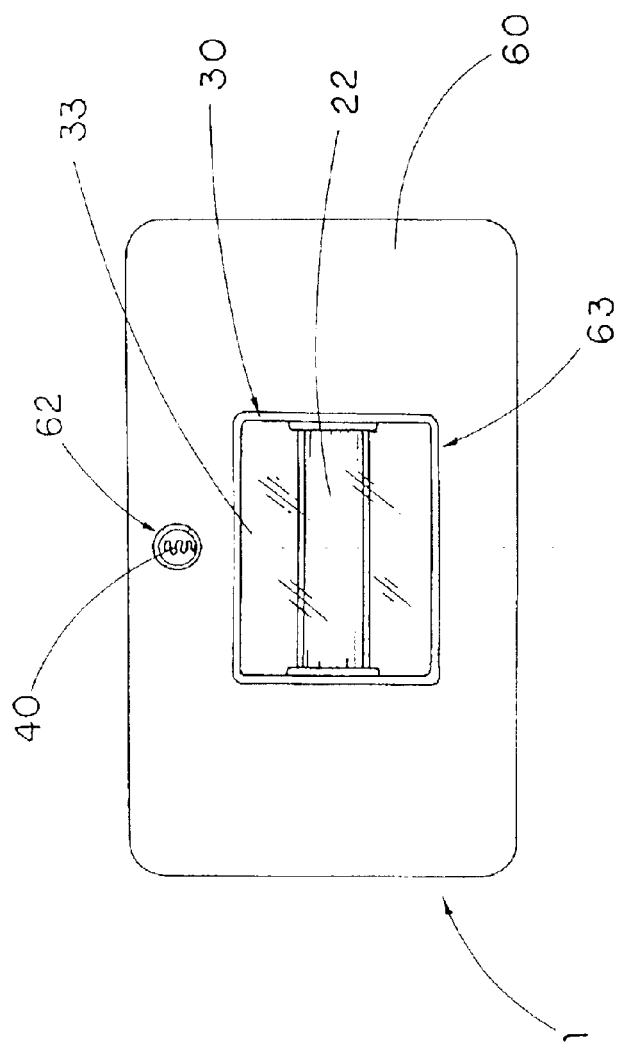
FIG. 3A is a front view of the sensitive lighting fixture installed to a construction junction box according to the above preferred embodiment of the present invention.
Figure 3B:
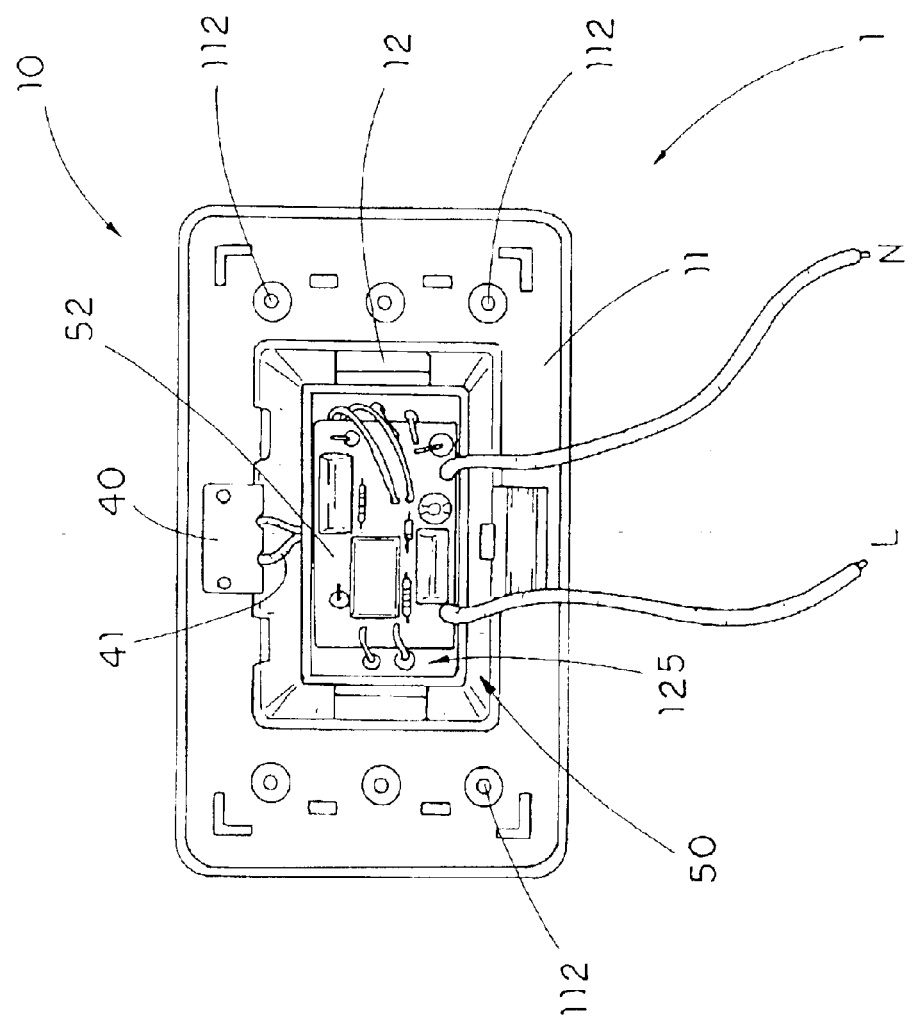
FIG. 3B is a rear view of the sensitive lighting fixture with the case cover detached according to the above preferred embodiment of the present invention.

In order to cover the holes 112 on the front plate 1 and lock up the light shade 30, the sensitive lighting fixture 1 further comprises a protective cover 60, as shown in FIGS. 2 and 3A, is used to attach on the front plate 11. The protective cover 60 comprises a plurality of engaging latches 61 integrally and rearwardly protruded from a back surface thereof and, correspondingly, the front plate 11 has a plurality of engaging slots 11, so that the protective cover 60 can be firmly attached on the front plate 11 by plugging the engaging latches 61 into the engaging slots 11. The protective cover 60 has a sensor lens 62 aligned with the control sensor 40 to enable the control sensor 40 exposing to outside and a window 63 to enable the light source 20 to communicate with outside. Since the protective cover 60 is attached to the front plate 11 without using any screws, the children generally can neither figure out how to open it nor have enough power to detach it from the front plate 11.

Referring to FIG. 7, a first, a second and a third alternative mode of the above preferred embodiment is illustrated as three sensitive lighting fixtures 1A, 1B and 1C installed to three construction junction boxes A2A, A2B and A2C provided on a wall W1, wherein the first alternative mode of the sensitive lighting fixture 1A is structurally same as the above preferred embodiment, as shown in FIGS. 2 to 6, except that a figure. 331 is printed on the cover lens 33 of the light shade 30 so that the light beam emitted from the light source 20 through the light shade 30 forms a decorative pattern.

Figure 8:
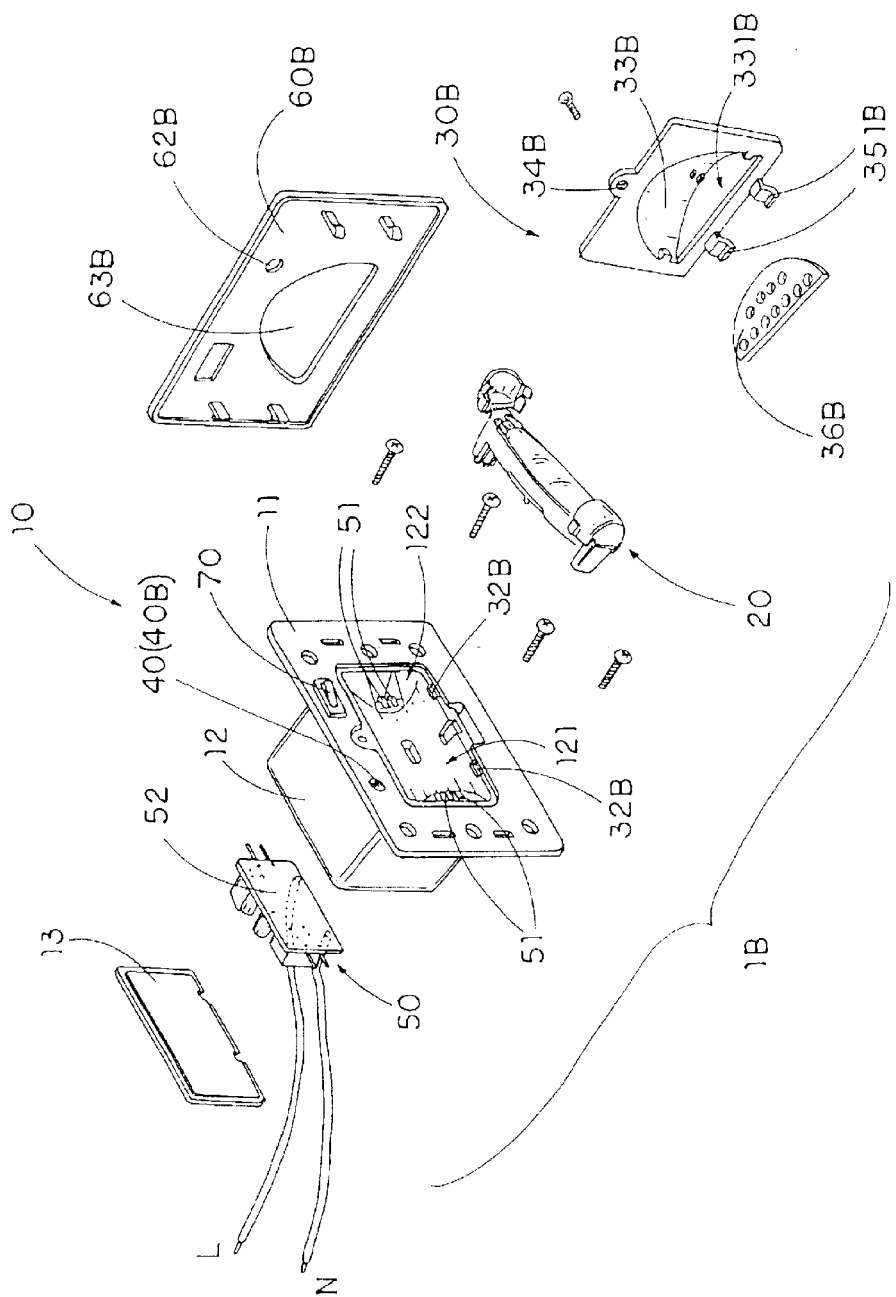
FIG. 8 is an exploded perspective view of the second alternative mode of the sensitive lighting fixture for construction junction box according to the above preferred embodiment of the present invention.

As shown in FIGS. 7 and 8, the second alternative mode of the sensitive lighting fixture 1B has the same structure of the above preferred embodiment except the light shade 30B and the protective cover 60B. Moreover, the sensitive lighting fixture 1B further comprises a switch means 70 electrically connected to the circuit unit 52. Instead of forming the cover lens 33, the second alternative mode provides an arc shaped shelter 33B frontwardly protruded that has a bottom opening 331B. Alternatively, the light shade 30B is detachably attached on front plate 11 to cover the recessed cavity 121 and the light source opening 122 by inserting two locking pins 351B rearwardly protruded from a bottom edge of the light shade 30B into two locking slots 32B provided at a bottom edge of the lighting source opening 122 and screwing a top lip 34B of the light shade 30B to a top edge of the lighting source opening 122. If the light shade 30B is made of non-transparent material, the light beams from the light source 20 can only be emitted through the bottom opening 331B towards the ground to avoid direct eye glaring. The light shade 30B may further comprise a transparent filter lens 36B mounted at the bottom opening 331B so as to prevent insects from getting in the recessed cavity 121. Correspondingly, the window 63B of protective cover 60B is made in semi-circular shape to match with the shape of the shelter 33B.

In addition, the switch means 70 is incorporated in the circuitry of the circuit unit 52 to control the control sensor 40B in such a manner that when the switch means 70 is switched off, the control sensor 40B is not functioned and reacted with the changes of the environment, and when the switch means 70 is switched on, the control sensor 40 is functioning to sense the change of the environment, such as whether there is a live motion occurred in the surrounding if the control sensor 40 is motion sensor, or whether there is ambient light in the surrounding if the control sensor is a visible light detecting photocell. Alternatively, the switch means 70 can also be arranged in the circuitry to function as a power switch that enables the sensitive lighting fixture 1B to practically replace a room lighting switch or a ceiling fan switch, so that the user can still use the switch means 70 to turn on/off the ceiling fan, the ceiling light or the floor lamp of the environment while the sensitive lighting fixture 1B functions as an indication light or night light. Therefore, the user can locate the power switch easily in dark.

The third alternative mode of the sensitive lighting fixture 1C as shown in FIG. 7 has the same structure of the above preferred embodiment, except that a motion sensor 40B is used as the control sensor 40 and a power socket 80 is incorporated therewith. The power socket 80 is electrically connected to the circuit unit 52 that is especially useful for replacing a wall socket with the sensitive lighting fixture 1 while still provide a power socket for the user. Moreover, a safety cover 81 is hinged on the protective cover 60C to normally cover the power socket 80 from outside while the user can simply flip up the safety cover 81 to reach the power socket 80 for use.

It is well known that electric wiring connection should be enclosed in a metal box such as construction junction box within the wall or behind the ceiling and floor for safety concerns. By incorporating the construction junction box, the sensitive lighting fixture of the present invention has no need to make the metal enclosure box that substantially reduces the product cost. In fact, both the base seat can be simply made by plastic. After the sensitive lighting fixture is installed within the existing construction junction box, the plastic base seat is enclosed and protected by the construction junction box while all electrical wiring connection are also within the construction junction box.

Figure 9:
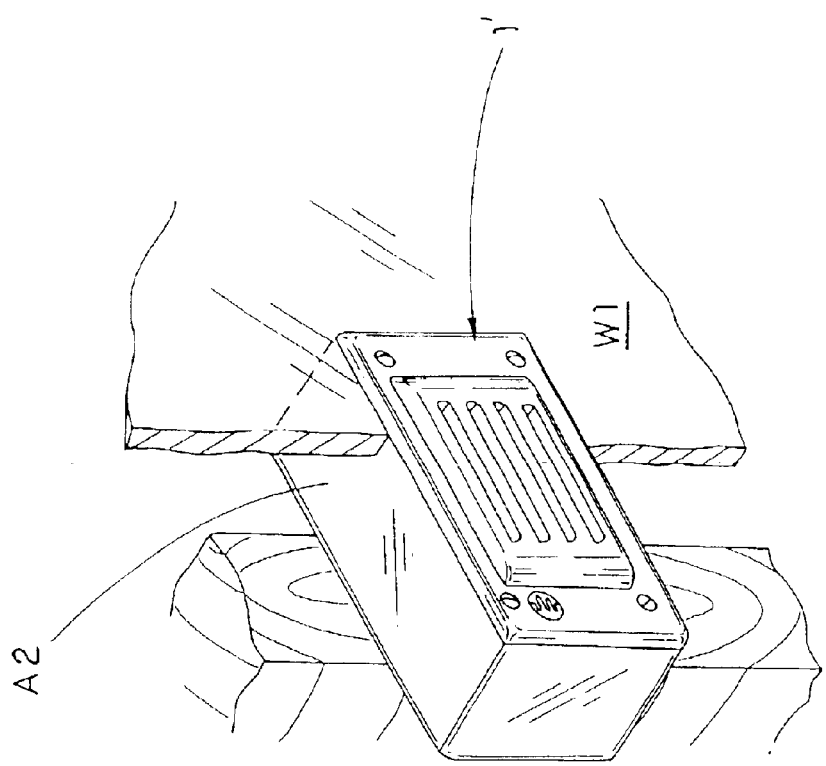
FIG. 9 is a perspective view showing a fourth alternative mode of the sensitive lighting fixture for construction junction box according to the above preferred embodiment.
Figure 10:
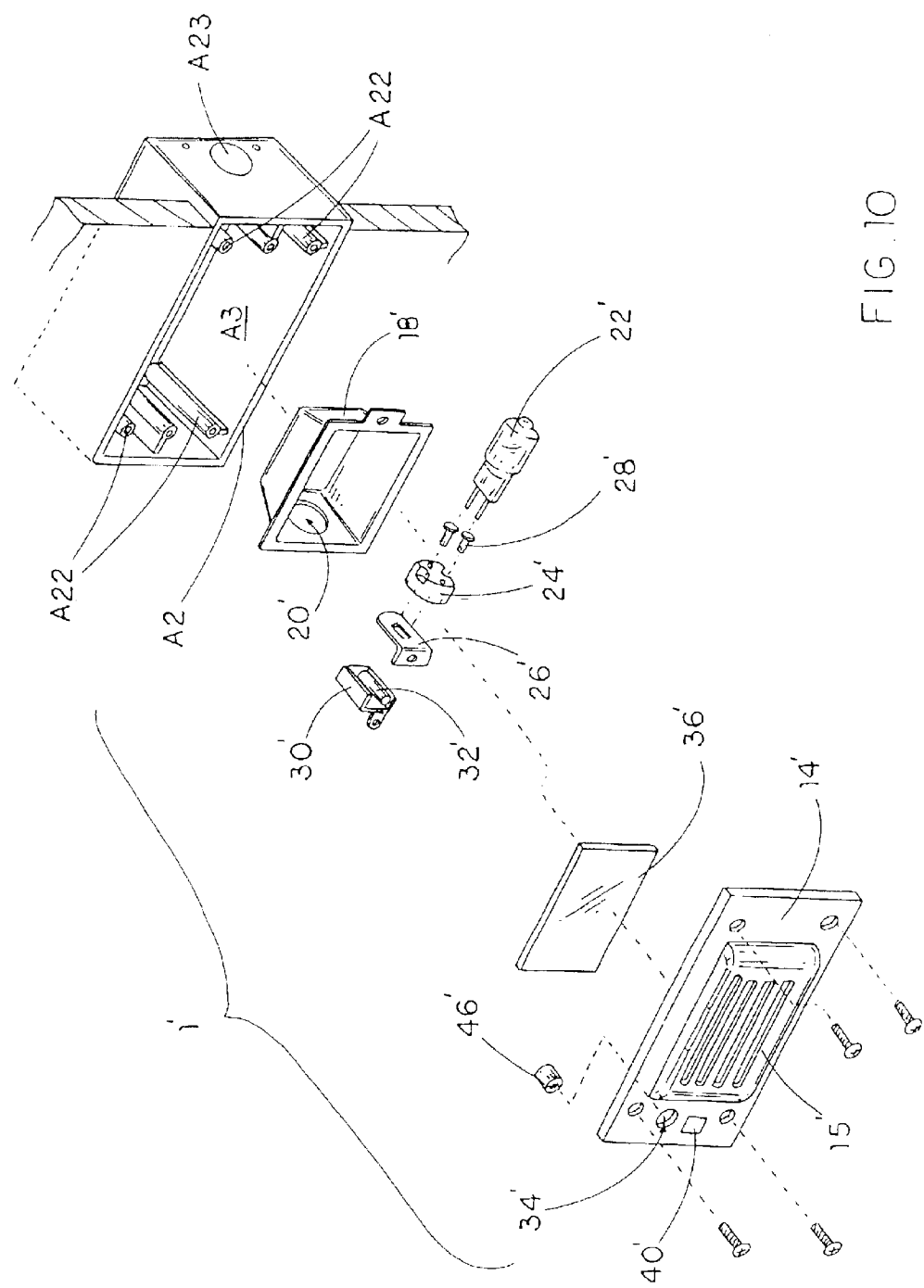
FIG. 10 is an exploded perspective view of the fourth alternative mode of the sensitive lighting fixture for construction junction box according to the above preferred embodiment.

Referring to FIGS. 9 and 10, a fourth alternative mode of the above preferred embodiment is illustrated, wherein the sensitive lighting fixture 1' is constructed to be incorporated with the construction junction box A2 which has an opening or pass-through A23 for the required electrical wiring which leads to and is connected into the normal electrical circuitry found in a home, apartment or other structure.

The sensitive lighting fixture 1' comprises a front plate or closure 14', a light reflector 18' adapted to be placed within the junction box A2. The light reflector 18' also has an opening or pass-through 18' for the accessing of electrical wiring for the electric bulb 22', preferably a halogen light. The electric bulb 22' is plugged into a lampholder 24'. The lampholder 24' is connected to the lampholder bracket 26' by screws 28'.

A photocell holder 30' acts as a retainer for photocell 32' which is in electrically operative connection to the electrical bulb 22'.

The photocell 32' is in proximity at its outer extremity to an access opening 34' which enables the photocell 32' to detect the presence or absence of ambient light in the external space beyond the front plate 14'. The photocell 32' may be within the junction box A2 or attached to the outside of the junction box A2 or to the front plate 14' or to the wall structure behind the front plate 14'.

A glass plate 36' may be provided between the inside of the front plate 14' and light reflector 18'.

The front plate 14' is provided with light louvers 38' which allows light from electrical bulb 22' to pass through the glass plate 36' and the front plate 14' when the electrical bulb 22' is turned on to provide night illumination in the space beyond the front plate 14'. A plurality of louvers 15' are preferably disposed to direct the illumination onto the floor or walkway to thereby make efficient use of the illumination and to avoid glare.

A manual off and in switch 40' may be provided to override the operation of the photocell 32'.

Figure 11:
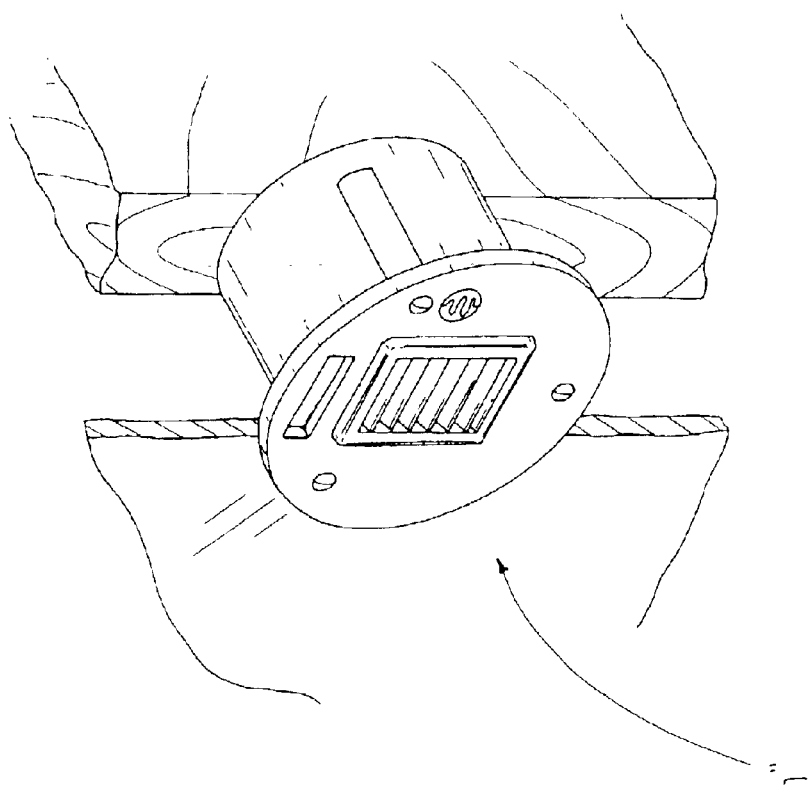
FIG. 11 is a perspective view showing a fifth alternative mode of the sensitive lighting fixture for construction junction box according to the above preferred embodiment.
Figure 12:
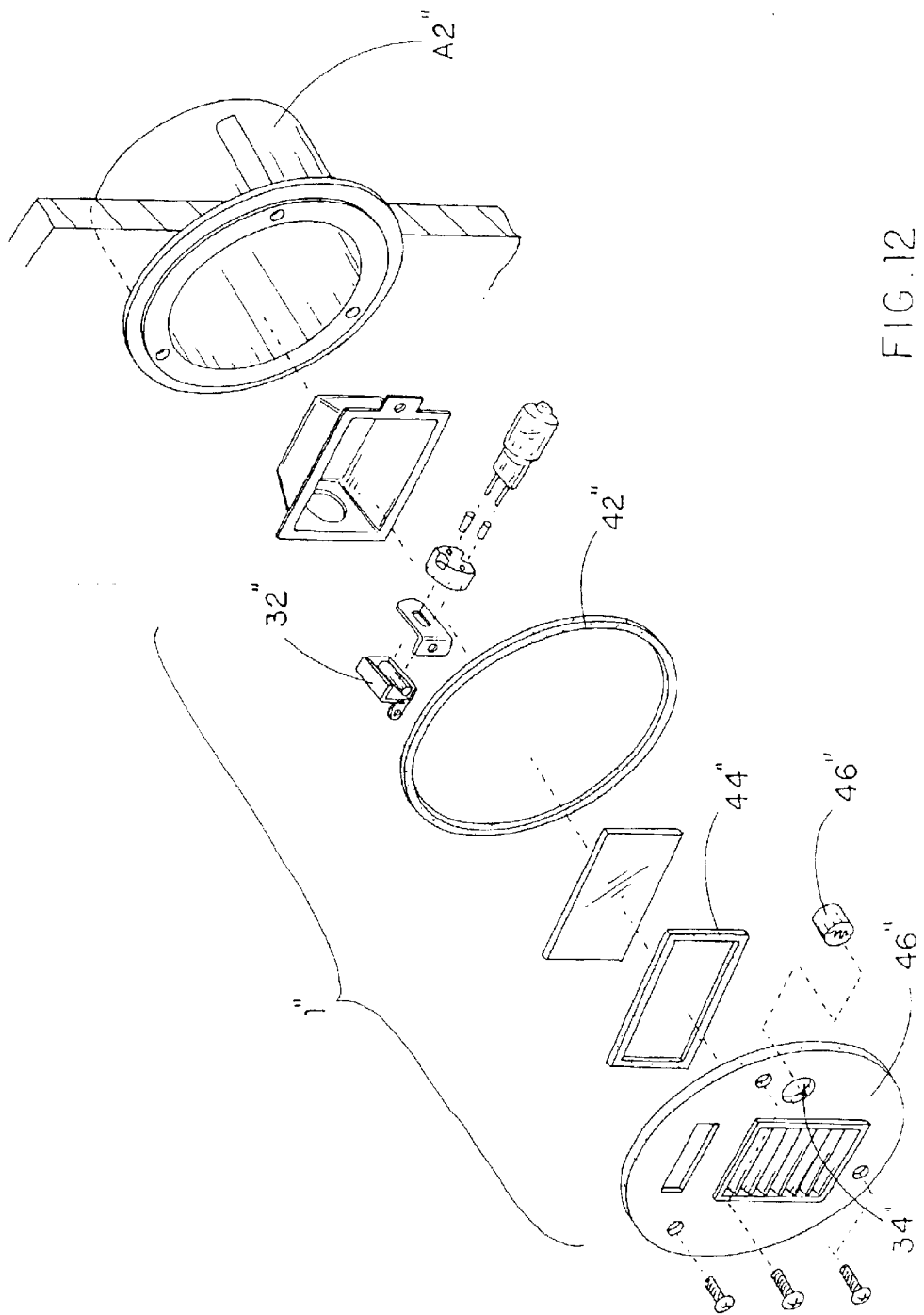
FIG. 12 is an exploded perspective view of the fifth alternative mode of the sensitive lighting fixture for construction junction box according to the above preferred embodiment.

Referring to FIGS. 11 and 12, a fifth alternative mode of the sensitive lighting fixture 1" of the above preferred embodiment is illustrated, which is designed for outside use, so that watertight sealing gaskets 42" and 44" may be provided to make the junction box A2" waterproof and moisture proof. Preferably, the junction box A2" is sealed, making it of universal application, both indoor and outdoor.

The junction box A2" containing the light source, light reflector and photocell is self-contained and portable in that it can be easily installed, removed and re-installed.

The opening 34" may be capped by cover 46" if reliance on the photocell 32" is not desired.

As shown in FIGS. 9 and 10, the sensitive lighting fixture 1' may be attached by screws, for example, to studs 46' forming part of the structural framing. The sensitive lighting fixture 1' is recessed so that the plate 14' is generally flush with the wall surface. The sensitive lighting fixture 1' does not intrude into the internal room space and is not subject to accidental damage. The sensitive lighting fixture 1' is free of exposed electrical outlets and does not present an attractive nuisance to small children.

When a low watt light bulb or fluorescent element is used as the light source and a visible lighting detector is equipped, the sensitive lighting fixture of the present invention functions automatically in response to changes in ambient lighting without need for manual manipulation or human tending, wherein the light is turned off and on whether or not someone is at home or on the premises, especially when a motion sensor is used as the control sensor. Thus, this invention provides significant security advantages as follows:

(1) The sensitive lighting fixture is specifically designed to incorporate with the construction junction box built on wall, ceiling or floor to form a utility lighting device, wherein the sensitive lighting fixture is capable of replacing the not-in-use wall socket or switch panel to avoid unwanted hazard to the environment and children while providing an additional utility function such as night light, walkway indicator, and etc. In other words, by replacing a non-use wall socket with the sensitive lighting fixture while using the existing construction junction box can substantially prevent the children and pets from getting electric shocks at the non-use wall sockets.

(2) Since the metal made existing construction junction box built on wall, ceiling or floor is used as an exterior housing of the sensitive lighting fixture, so that the sensitive lighting fixture of the present invention has no need to manufacture the metal case to enclose the electrical connections of the sensitive lighting fixture that reduces not only the manufacturing steps but also the product cost.

(3) The sensitive lighting fixture for construction junction box is easy to install and the users have no need to worry about the electrical power source for the sensitive lighting fixture since the electric wires are already extended and provided inside the construction junction box.

(4) The sensitive lighting fixture provides a recessed lighting fixture on wall without the need of drilling extra hole on wall and extending electric wires thereto from electric power source.

(5) The sensitive lighting fixture provides a recessed night light having a wall flat surface to avoid any component projected outwardly from the wall so as to present hazard to children and inconvenience.

(6) The sensitive lighting fixture provides a plug-in type fluorescent lamp in low voltage as light source and a specifically designed fluorescent lamp socket to receive and mount the plug-in type fluorescent lamp thereto, so that the unplugging of the plug-in type fluorescent lamp is as simple as just pulling out the plug-in type fluorescent lamp outwardly from the socket and the installation of the plug-in type fluorescent lamp is also as simple as just inwardly plugging in two terminal arms of the fluorescent lamp into two terminal slots of the fluorescent lamp socket respectively, wherein the fluorescent lamp has a better linear electric contact to ensure steady power supply.

(7) The sensitive lighting fixture for construction junction box comprises light shade utilizing a detachable hinge to connect with the base seat for covering the fluorescent lamp inside the light source recess, wherein the users can easily reach the fluorescent lamp for replacement by detaching or hinging up the light shade. Therefore, the users can change the fluorescent lamp of different color any time easily.

(8) The sensitive lighting fixture may comprise a light shelter to guide the light beams downwards so as to prevent direct front access of the lighting beams that may be annoyed with some users. In addition, a filter lens can be installed to the bottom opening of the light shelter to prevent insects from getting inside the light source recess.

(9) The sensitive lighting fixture for construction junction box comprises a visible light detecting photocell to control the switch on or off of the lighting fixture, whereby the photocell is adapted to turn the light source off when the photocell detects ambient light and on when the photocell does not detect ambient light.

(10) The sensitive lighting fixture for construction junction box may further comprise a switch that enables the users to turn off the photocell and the lighting fixture at will. Moreover, an auxiliary socket with hinged cover is provided on the lighting fixture so as to provide a power source at that construction junction box for users who may occasionally need a power source at such location.

(11) When the sensitive lighting fixture is used as a night lighting fixture, it operates automatically to provide night lighting which represents a major security advantage in that night lighting no longer depends on human intervention. Further, no timers are involved so that illumination occurs only actually needed, that is, when darkness or near darkness has arrived.

(12) The sensitive lighting fixture is recessed within a wall and has nothing which projects outwardly from the wall surface to consume space, interfere with cleaning, or to attract children and thereby expose them to the risk of touching a live electrical contact. The sensitive lighting fixture has a flush mounted front plate which conceals the recess.

(13) In one embodiment, the light source, the light reflector, photocell and all of the connecting wiring are recessed within the construction junction box.

(14) In one embodiment, the sensitive lighting fixture is provided with a recessed photocell which is in light communication with the outside front surface of fixture and is adapted to automatically turn the light "on" in response to darkness and turn the light "off" in response to ambient light. The fixture may also be provided with a flush mounted, front plate which can have a manually operated on-and-off switch to override the photocell operation. Moreover, the sensitive lighting fixture can be sealed against water and the other elements to make it suitable for installation in outside walls as well as in interior walls.

(15) In one embodiment, the sensitive lighting fixture is preferably provided with louvers in the front plate through which the illumination from the light source passes. The louvers are configured to cause the illumination to be downwardly directed toward the floor which reduces glare, waste of light, and avoids excessive illumination which can interfere with comfortable sleep.

(16) The user is free to change the color of the lamp and/or the color and style of the filter lens from time to time so as to match the interior design of the environment as well as the mood of the user.

One skilled in the art will understand that the embodiment of the present invention as shown in the drawings and described above is exemplary only and not intended to be limiting. It will thus be seen that the objectives of the present invention have been fully and effectively accomplished. The embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A sensitive lighting fixture for a construction junction box installed on a surface to provide a recessed cavity surrounding with metal walls, wherein electric wires from a power source are extended inside said recessed cavity, wherein said sensitive lighting fixture comprises:

a base seat comprising a front plate and a recessed case rearwardly extended from said front plate, wherein said recessed case has a light source socket indented therein and a light source opening opened on said front plate, wherein said recessed case is sized for disposing inside said recessed cavity of said construction junction box while said front plate is sized for covering said recessed cavity of said construction junction box;

a light source which is a fluorescent lamp disposed in said light source socket, wherein said fluorescent lamp comprises a fluorescent lamp seat and a fluorescent lamp element mounted on said fluorescent lamp seat, wherein said fluorescent lamp seat comprises a seat housing having a front opening, two terminal arms rearwardly extended from two ends of said seat housing, and two end holders hinged at two ends of said seat housing, wherein said fluorescent lamp element comprises a tubular fluorescent lamp bulb and two pairs of terminal wires extended from two ends of said fluorescent lamp bulb to said two terminal arms to form two pairs of electrical terminal contacts;

a light shade which is detachably attached to said front plate of base seat and sized to cover said light source opening;

a control sensor provided on said front plate of said base seat and exposed to outside; and a control means for electrically connecting said light source with said electric wires extended inside said construction junction box and electrically connecting said control sensor and said light source in such a manner that said control sensor turns said light source off when said control sensor detects an off-condition and on when said control sensor detects an on-condition.

2. The sensitive lighting fixture, as recited in claim 1, wherein said light source socket provides two terminal slots spaced apart adapted for said two terminal arms to insert therein respectively so as to mount said light source within said light source socket and being positioned in front of said reflection surface.

3. The sensitive lighting fixture, as recited in claim 2, wherein said control means includes two pairs of socket terminals extended through said recessed case and a circuit unit, wherein each of said socket terminals has a front resilient portion extended into said respective terminal slot to form a socket terminal and a rear end extended into a rear chamber of said recessed case where said circuit unit is received therein, wherein said two pairs of socket terminals are arranged in such a manner that when said two terminal arms of said light source are plugged into said two terminal slots respectively, said two pairs of socket terminals are pressed against said two pairs of terminal contacts for conducting electricity between said circuit unit and said fluorescent lamp element of said light source.

4. The sensitive lighting fixture, as recited in claim 3, wherein said circuit unit mainly interacts said control sensor with said light source in such a manner that said control sensor turns said fluorescent lamp element of said light source off when said control sensor detects an off-condition and on when said control sensor detects an on-condition.

5. The sensitive lighting fixture, as recited in claim 4, wherein said control means further comprises elongated input wires extended from said circuit unit for electrically connecting with said electric wires within said recessed cavity for power source connection while said recessed case is disposed inside said recessed cavity.

6. The sensitive lighting fixture, as recited in claim 4, wherein said control sensor is a visible light detector that is electrically connected to said circuit unit and adapted to turn said light source off when said visible light detector detects ambient light, that is said off-condition, and on when said visible light detector does not detect ambient light, that is said on-condition.

7. The sensitive lighting fixture, as recited in claim 6, wherein said control means further comprises elongated input wires extended from said circuit unit for electrically connecting with said electric wires within said recessed cavity for power source connection while said recessed case is disposed inside said recessed cavity.

8. The sensitive lighting fixture, as recited in claim 4, wherein said control sensor is a motion sensor which is adapted to turn said light source off when there is no live motion is detected, that is said off-condition, and on when there is live motion detected, that is said on-condition.

9. The sensitive lighting fixture, as recited in claim 8, wherein said control means further comprises elongated input wires extended from said circuit unit for electrically connecting with said electric wires within said recessed cavity for power source connection while said recessed case is disposed inside said recessed cavity.

10. The sensitive lighting fixture, as recited in claim 1, wherein each of said two terminal arms has a pair of though holes and said fluorescent lamp element is arranged to sit on and extend along said fluorescent lamp element, wherein said two pairs of terminal wires are rearwardly extended through said two pairs of through holes until four terminal end portions of said terminal wires are rearwardly extended out of said terminal arms respectively and bent inwardly to against two inner contact sides of said two terminal arms respectively to form said two pairs of electrical terminal contacts.

11. The sensitive lighting fixture, as recited in claim 10, wherein said light source socket provides two terminal slots spaced apart adapted for said two terminal arms to insert therein respectively so as to mount said light source within said light source socket and being positioned in front of said reflection surface.

12. The sensitive lighting fixture, as recited in claim 11, wherein said control means includes two pairs of socket terminals extended through said recessed case and a circuit unit, wherein each of said socket terminals has a front resilient portion extended into said respective terminal slot to form a socket terminal and a rear end extended into a rear chamber of said recessed case where said circuit unit is received therein, wherein said two pairs of socket terminals are arranged in such a manner that when said two terminal arms of said light source are plugged into said two terminal slots respectively, said two pairs of socket terminals are pressed against said two pairs of terminal contacts for conducting electricity between said circuit unit and said fluorescent lamp element of said light source.

13. The sensitive lighting fixture, as recited in claim 12, wherein at least a hinge slot is spacedly formed at a top edge of said lighting source opening, wherein said light shade comprises a cover lens for light beam passing therethrough and at least a hinge arm extended from a top side of said light shade rearwardly, wherein said hinge arm has an arc shape and comprises a stopper rib rearwardly and upwardly protruded from a free end portion of said hinge arm, wherein said light shade is detachably attached to said front plate of base seat by inserting said hinge arm through said hinge slot until said hinge arm is positioned behind said front plate so as to normally hang down said light shade due to gravity.

14. The sensitive lighting fixture, as recited in claim 13, wherein a locking slot is formed at a bottom edge of said lighting source opening and a locker latch is protruded rearwardly from a bottom side of said light shade, wherein said light shade is able to be locked in position by engaging said locker latch in said locking slot, whereby to open said recessed cavity, after disengaging said locker latch from said locking slot, said light shade is capable of lifting up about said hinge arm until said stopper rib blocks against a top wall of said recessed case, so that said hinge arm enables said light shade swinging up and down through said hinge slot and said stopper rib prevent said hinge arm from directly swinging out of said hinge slot.

15. The sensitive lighting fixture, as recited in claim 12, wherein said light shade comprises an arc shaped shelter frontwardly protruded thereon and forms a bottom opening thereof, wherein said light shade is detachably attached on said front plate to cover said recessed cavity and said light source opening.

16. The sensitive lighting fixture, as recited in claim 15, wherein said light shade further comprise a transparent filter lens mounted at said bottom opening.

17. The sensitive lighting fixture, as recited in claim 15, further comprises a switch means electrically connected to said circuit unit, wherein said switch means is incorporated in said circuitry of said circuit unit to control said control sensor in such a manner that when said switch means is switched off, said control sensor is deactivated to detect ambient light, and when said switch means is switched on, said control sensor functions to detect ambient light.

18. The sensitive lighting fixture, as recited in claim 15, further comprises a switch means electrically connected to said control means to function as a power switch of an environment.

19. The sensitive lighting fixture, as recited in claim 12, wherein said circuit unit mainly interacts said control sensor with said light source in such a manner that said control sensor turns said fluorescent lamp element of said light source off when said control sensor detects an off-condition and on when said control sensor detects an on-condition.

20. The sensitive lighting fixture, as recited in claim 19, wherein said control means further comprises elongated input wires extended from said circuit unit for electrically connecting with said electric wires within said recessed cavity for power source connection while said recessed case is disposed inside said recessed cavity.

21. The sensitive lighting fixture, as recited in claim 19, further comprises a switch means electrically connected to said circuit unit, wherein said switch means is incorporated in said circuit unit to control said control sensor in such a manner that when said switch means is switched off, said control sensor is not functioned and reacted with a change of an environment, and when said switch means is switched on, said control sensor is functioning to sense said change of said environment.

22. The sensitive lighting fixture, as recited in claim 19, further comprises a switch means electrically connected to said control means to function as a power switch of an environment.

23. The sensitive lighting fixture, as recited in claim 19, further comprising a power socket provided on said front plate, wherein said power socket is electrically connected to said control means to provide power supply.

24. The sensitive lighting fixture, as recited in claim 19, wherein said control sensor is a motion sensor which is adapted to turn said light source off when there is no live motion is detected, that is said off-condition, and on when there is live motion detected, that is said on-condition.

25. The sensitive lighting fixture, as recited in claim 24, wherein said control means further comprises elongated input wires extended from said circuit unit for electrically connecting with said electric wires within said recessed cavity for power source connection while said recessed case is disposed inside said recessed cavity.

26. The sensitive lighting fixture, as recited in claim 25, wherein said front plate fully covers said recessed cavity and has a plurality of mounting holes provided at two side portions that are aligned with said four corner screw sockets of said construction junction box, so that said base seat is fastened in position by screwing said front plate to said construction junction box through said mounting holes and said screw sockets.

27. The sensitive lighting fixture, as recited in claim 26, wherein said sensitive lighting fixture further comprises a protective cover which comprises a plurality of engaging latches integrally and rearwardly protruded from a back surface thereof and, correspondingly, said front plate has a plurality of engaging slots, wherein said protective cover is attached on said front plate by plugging said engaging latches into said engaging slots, wherein said protective cover has a sensor lens aligned with said control sensor to enable said control sensor exposing to outside and a window to enable said light source to communicate with outside.

28. The sensitive lighting fixture, as recited in claim 19, wherein said control sensor is a visible light detector that is electrically connected to said circuit unit and adapted to turn said light source off when said visible light detector detects ambient light, that is said off-condition, and on when said visible light detector does not detect ambient light, that is said on-condition.

29. The sensitive lighting fixture, as recited in claim 28, wherein said visible light detector is a visible light detecting photocell.

30. The sensitive lighting fixture, as recited in claim 28, further comprises a switch means electrically connected to said circuit unit, wherein said switch means is incorporated in said circuitry of said circuit unit to control said control sensor in such a manner that when said switch means is switched off, said control sensor is deactivated to detect ambient light, and when said switch means is switched on, said control sensor functions to detect ambient light.

31. The sensitive lighting fixture, as recited in claim 28, further comprises a switch means electrically connected to said control means to function as a power switch of an environment.

32. The sensitive lighting fixture, as recited in claim 28, further comprising a power socket, which is provided on said front plate and electrically connected to said control means to provide power supply, and a hinged safety cover to cover said power socket from outside when said power socket is not in use.

33. The sensitive lighting fixture, as recited in claim 28, wherein at least a hinge slot is spacedly formed at a top edge of said lighting source opening, wherein said light shade comprises a cover lens for light beam passing therethrough and at least a hinge arm extended from a top side of said light shade rearwardly, wherein said hinge arm has an arc shape and comprises a stopper rib rearwardly and upwardly protruded from a free end portion of said hinge arm, wherein said light shade is detachably attached to said front plate of base seat by inserting said hinge arm through said hinge slot until said hinge arm is positioned behind said front plate so as to normally hang down said light shade due to gravity.

34. The sensitive lighting fixture, as recited in claim 23, wherein a locking slot is formed at a bottom edge of said lighting source opening and a locker latch is protruded rearwardly from a bottom side of said light shade, wherein said light shade is able to be locked in position by engaging said locker latch in said locking slot, whereby to open said recessed cavity, after disengaging said locker latch from said locking slot, said light shade is capable of lifting up about said hinge arm until said stopper rib blocks against a top wall of said recessed case, so that said hinge arm enables said light shade swinging up and down through said hinge slot and said stopper rib prevent said hinge arm from directly swinging out of said hinge slot.

35. The sensitive lighting fixture, as recited in claim 28, wherein said light shade comprises an arc shaped shelter frontwardly protruded thereon and forms a bottom opening thereof, wherein said light shade is detachably attached on said front plate to cover said recessed cavity and said light source opening.

36. The sensitive lighting fixture, as recited in claim 35, wherein said light shade further comprise a transparent filter lens mounted at said bottom opening.

37. The sensitive lighting fixture, as recited in claim 35, further comprises a switch means electrically connected to said circuit unit, wherein said switch means is incorporated in said circuitry of said circuit unit to control said control sensor in such a manner that when said switch means is switched off, said control sensor is deactivated to detect ambient light, and when said switch means is switched on, said control sensor functions to detect ambient light.

38. The sensitive lighting fixture, as recited in claim 35, further comprises a switch means electrically connected to said control means to function as a power switch of an environment.

39. The sensitive lighting fixture, as recited in claim 38, further comprising a hinged safety cover to cover said power socket from outside when said power socket is not in use.

40. The sensitive lighting fixture, as recited in claim 28, wherein said control means further comprises elongated input wires extended from said circuit unit for electrically connecting with said electric wires within said recessed cavity for power source connection while said recessed case is disposed inside said recessed cavity.

41. The sensitive lighting fixture, as recited in claim 40, wherein at least a hinge slot is spacedly formed at a top edge of said lighting source opening, wherein said light shade comprises a cover lens for light beam passing therethrough and at least a hinge arm extended from a top side of said light shade rearwardly, wherein said hinge arm has an arc shape and comprises a stopper rib rearwardly and upwardly protruded from a free end portion of said hinge arm, wherein said light shade is detachably attached to said front plate of base seat by inserting said hinge arm through said hinge slot until said hinge arm is positioned behind said front plate so as to normally hang down said light shade due to gravity.

42. The sensitive lighting fixture, as recited in claim 41, wherein a locking slot is formed at a bottom edge of said lighting source opening and a locker latch is protruded rearwardly from a bottom side of said light shade, wherein said light shade is able to be locked in position by engaging said locker latch in said locking slot, whereby to open said recessed cavity, after disengaging said locker latch from said locking slot, said light shade is capable of lifting up about said hinge arm until said stopper rib blocks against a top wall of said recessed case, so that said hinge arm enables said light shade swinging up and down through said hinge slot and said stopper rib prevent said hinge arm from directly swinging out of said hinge slot.

43. The sensitive lighting fixture, as recited in claim 40, wherein said light shade comprises an arc shaped shelter frontwardly protruded thereon and forms a bottom opening thereof, wherein said light shade is detachably attached on said front plate to cover said recessed cavity and said light source opening.

44. The sensitive lighting fixture, as recited in claim 43, wherein said light shade further comprise a transparent filter lens mounted at said bottom opening.

45. The sensitive lighting fixture, as recited in claim 43, further comprises a switch means electrically connected to said circuit unit, wherein said switch means is incorporated in said circuitry of said circuit unit to control said control sensor in such a manner that when said switch means is switched off, said control sensor is deactivated to detect ambient light, and when said switch means is switched on, said control sensor functions to detect ambient light.

46. The sensitive lighting fixture, as recited in claim 43, further comprises a switch means electrically connected to said control means to function as a power switch of an environment.

47. The sensitive lighting fixture, as recited in claim 40, wherein said front plate fully covers said recessed cavity and has a plurality of mounting holes provided at two side portions that are aligned with said four corner screw sockets of said construction junction box, so that said base seat is fastened in position by screwing said front plate to said construction junction box through said mounting holes and said screw sockets.

48. The sensitive lighting fixture, as recited in claim 47, wherein said sensitive lighting fixture further comprises a protective cover which comprises a plurality of engaging latches integrally, and rearwardly protruded from a back surface thereof and, correspondingly, said front plate has a plurality of engaging slots, wherein said protective cover is attached on said front plate by plugging said engaging latches into said engaging slots, wherein said protective cover has a sensor lens aligned with said control sensor to enable said control sensor exposing to outside and a window to enable said light source to communicate with outside.

49. The sensitive lighting fixture, as recited in claim 48, wherein said light shade comprises an arc shaped shelter frontwardly protruded thereon and forms a bottom opening thereof, wherein said light shade is detachably attached on said front plate to cover said recessed cavity and said light source opening.

50. The sensitive lighting fixture, as recited in claim 49, wherein said light shade further comprise a transparent filter lens mounted at said bottom opening.

51. The sensitive lighting fixture, as recited in claim 49, further comprises a switch means electrically connected to said circuit unit, wherein said switch means is incorporated in said circuitry of said circuit unit to control said control sensor in such a manner that when said switch means is switched off, said control sensor is deactivated to detect ambient light, and when said switch means is switched on, said control sensor functions to detect ambient light.

52. The sensitive lighting fixture, as recited in claim 49, further comprising a power socket, which is provided on said front plate and electrically connected to said control means to provide power supply, and a hinged safety cover to cover said power socket from outside when said power socket is not in use.

53. The sensitive lighting fixture, as recited in claim 49, further comprises a switch means electrically connected to said control means to function as a power switch of an environment.

54. The sensitive lighting fixture, as recited in claim 53, further comprising a hinged safety cover to cover said power socket from outside when said power socket is not in use.

55. The sensitive lighting fixture, as recited in claim 48, wherein at least a hinge slot is spacedly formed at a top edge of said lighting source opening, wherein said light shade comprises a cover lens for light beam passing therethrough and at least a hinge arm extended from a top side of said light shade rearwardly, wherein said hinge arm has an arc shape and comprises a stopper rib rearwardly and upwardly protruded from a free end portion of said hinge arm, wherein said light shade is detachably attached to said front plate of base seat by inserting said hinge arm through said hinge slot until said hinge arm is positioned behind said front plate so as to normally hang down said light shade due to gravity.

56. The sensitive lighting fixture, as recited in claim 55, wherein a locking slot is formed at a bottom edge of said lighting source opening and a locker latch is protruded rearwardly from a bottom side of said light shade, wherein said light shade is able to be locked in position by engaging said locker latch in said locking slot, whereby to open said recessed cavity, after disengaging said locker latch from said locking slot, said light shade is capable of lifting up about said hinge arm until said stopper rib blocks against a top wall of said recessed case, so that said hinge arm enables said light shade swinging up and down through said hinge slot and said stopper rib prevent said hinge arm from directly swinging out of said hinge slot.

57. The sensitive lighting fixture, as recited in claim 56, further comprises a switch means electrically connected to said circuit unit, wherein said switch means is incorporated in said circuitry of said circuit unit to control said control sensor in such a manner that when said switch means is switched off, said control sensor is deactivated to detect ambient light, and when said switch means is switched on, said control sensor functions to detect ambient light.

58. The sensitive lighting fixture, as recited in claim 56, further comprises a switch means electrically connected to said control means to function as a power switch of an environment.

59. The sensitive lighting fixture, as recited in claim 56, further comprising a power socket, which is provided on said front plate and electrically connected to said control means to provide power supply, and a hinged safety cover to cover said power socket from outside when said power socket is not in use.

* * * * *